Dec. 31, 1968          N. S. KHOURY          3,419,183
BONDED METAL SIDE SEAM
Filed May 14, 1965
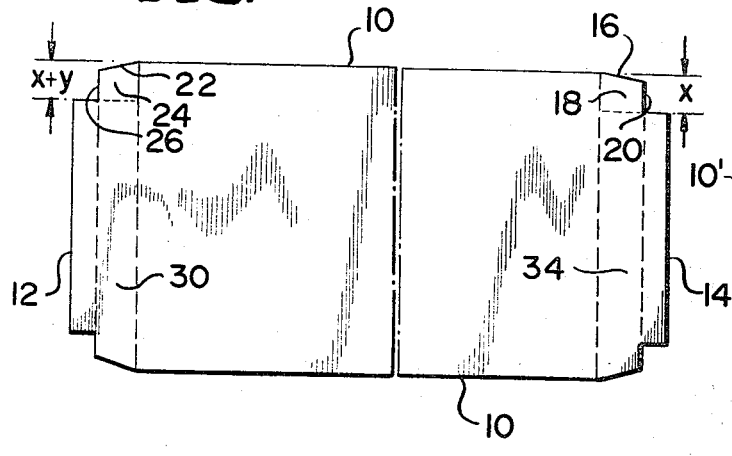
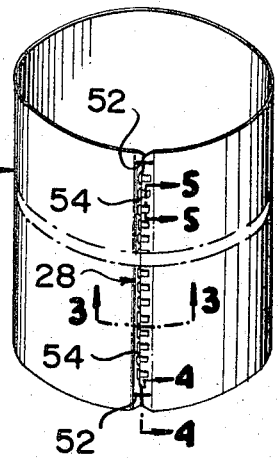
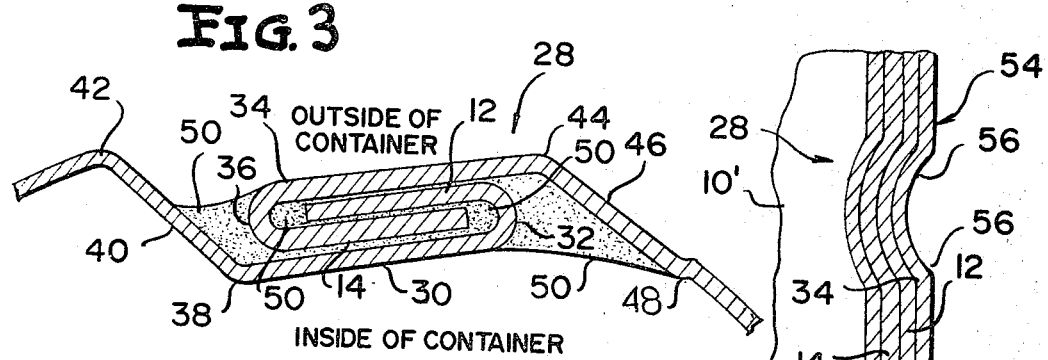
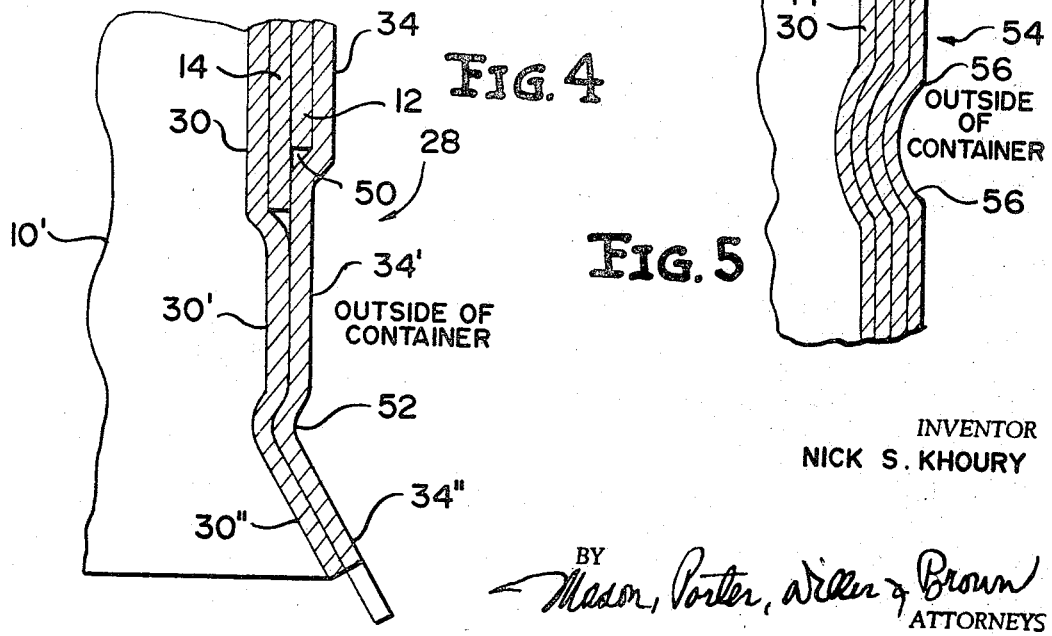
INVENTOR
NICK S. KHOURY
BY Mason, Porter, Diller & Brown
ATTORNEYS

United States Patent Office 3,419,183
Patented Dec. 31, 1968

3,419,183
BONDED METAL SIDE SEAM
Nick S. Khoury, Worth, Ill., assignor to Continental Can
 Company, Inc., New York, N.Y., a corporation of New
 York
Filed May 14, 1965, Ser. No. 455,810
10 Claims. (Cl. 220—77)

ABSTRACT OF THE DISCLOSURE

This disclosure has to do with tubular members in general, and more particularly container bodies incorporating a side seam. One of the features of the side seam is that it is tilted radially inwardly from the general outline of the container body so as to resist cleavage. Also, the side seam is of the double hook type and is sealed with an adhesive of the thermoplastic type. In order to increase the strength of the side seam, it is continuously beaded transversely thereof for a major portion of its length. In addition, at the base of each flange, which is normally found at the end of the container body, the seam is provided with a transverse bead to hold the seam together during the flanging of the container body and the formation of the usual double seam with a container end.

---

This invention relates to tubular members joined by a novel side seam and more specifically to a bonded metal side seam of a container or the like, the member being capable of being formed on conventional container forming equipment, the tubular member being of a material which does not readily lend itself to a soldering operation as practiced by the conventional equipment. This invention also contemplates the method of forming the tubular member.

The present invention has particular application in the construction of containers which are capable of storing material at pressures other than atmospheric and at temperatures other than room temperature, the containers being preferably fabricated from aluminum sheet stock which stock cannot be soldered on conventional production equipment. Aluminum containers for such pressure vessels in the past, have been produced by either the impact extrusion or the wall iron method which methods eliminate the usual soldered side seam. Containers produced by such methods are relatively expensive since the decoration on the outside of the container and the internal coating of the container must be applied after the container body is otherwise completed, which operations are slow and uneconomical as compared to the printing and coating of flat sheet stock used for forming container bodies of the present invention. Furthermore, the equipment used to fabricate such containers is specially constructed since the usual container body makers employed in can manufacturing plants cannot be used. The usual sheet coaters, drying ovens and other allied machines also are of no use and must be replaced with special equipment.

Probably the most widely used method for forming container bodies of containers for use in the beverage and other industries, is by the forming of the container body from a blank of sheet stock, the sheet stock having a length slightly greater than the diameter of the container body to be formed and a width substantially equal to the height of the container to be formed. In addition, the blank may be notched or severed as desired. The blank is then formed into a tubular configuration about the horn of a body maker and the adjacent ends of the blank are joined by a side seam. The side seam is then bumped, soldered, etc. so as to form a tubular member suitable for use as a container body and when container ends are affixed to the container body, a container is so produced.

The material from which containers produced by the foregoing description is usually of steel, coated steel, or the like which are relatively easily soldered and permit the formation of a relatively strong soldered side seam that is capable of withstanding the abnormal pressures and temperatures that such containers are subjected to after they have been filled and closed and while in heated retorts for pasteurized or sterilizing the contents.

Containers having side seams that are sealed with a suitable cement or adhesive are being produced from steel and aluminum on conventional production equipment. Such containers are suitable only for service at low pressures and temperatures. The adhesive employed is of the thermoplastic type and the seam possesses little strength. However, such containers are satisfactory for a variety of products such as motor oil, candies, powders, etc. The prior art cemented side seam containers have been unable to withstand retorting although much effort has been directed toward this goal.

It is obvious that if container bodies capables of withstanding high temperatures and pressures could be fabricated from aluminum or other difficult to solder metals in blank form on the container body making machines and other standard machines, a tremendous saving would be achieved. Therefore, the present invention relates to the forming of container bodies from material, such as aluminum, on conventional production equipment with a minimum of modifications to the equipment. For example, the soldering station is removed and a thermosetting adhesive applicator is employed to apply a thermosetting adhesive to at least one end of the blank at which the seam is to be formed. In addition, special "bumping" equipment forms a novel tilted and beaded side seam and a novel pre-flange bead at each end of the seam.

Accordingly, it becomes the principal object of the present invention to provide an improved container body for supporting materials at abnormal pressures, temperatures and humidities when the body is formed into a container and, to a method for forming the same.

It is a further object of the present invention to provide an improved container body of a relatively light metal capable of supporting material at pressures other than atmospheric, at temperatures other than room temperature, and at high humidity, when the body is formed into a container.

It is a further object of the present invention to provide an improved container body of a relatively light metal having a unique side seam construction which is capable of supporting material at pressures other than atmospheric and temperatures other than room temperature when the body is formed into a container.

It is a further object of the present invention to provide an improved container body of a relatively light metal having a unique side seam construction which is capable of supporting material at pressures other than atmospheric when the body is formed into a container and wherein the side seam is bonded, such as with an adhesive.

It is a further object of the present invention to provide an improved container body of a relatively light metal having a unique bonded side seam which is tilted inwardly so that it tends to inhibit cleavage when supporting material at elevated pressures in containers fabricated from the body.

It is a further object of the present invention to provide an improved container body of a relatively light metal having a unique bonded side seam which is tilted inwardly so that it tends to inhibit cleavage when supporting material at elevated pressures in containers fabricated from the body, said side seam being bonded and provided with special beading so as to effectively increase the length of the seam and to yield a stronger bond.

It is a further object of the present invention to provide an improved container body which bears a novel pre-flange in the area adjacent the side seam so as to permit easier completion of the container flange in a double seaming operation.

It is a still further object of the present invention to provide an improved container body capable of bearing unusual pressures and temperatures and having novel features lending rigidity to its construction such as a tilted side seam, the seam being bonded and beaded and the container body bearing a novel pre-flange, the construction taking place on modified conventional equipment.

Before the present invention, numerous attempts were made to develop a successful aluminum beverage can fabricated entirely from sheet stock on conventional equipment. Little success was attained in these attempts. One of the problems present was that the bonded side seam configurations devised could not withstand the internal pressure developed in the container during heat processing or pasteurization of the product within the container which is usually accomplished by placing the container in a high temperature retort. The present invention provides a seam construction of a container body which employs the novel features combined in a successful manner such as the bonding of the seam with a thermosetting type of adhesive, providing an inwardly tilted side seam configuration, providing a continuous novel beading of the side seam, providing a novel pre-flanging of the body at the ends adjacent the side seam, and, supplying a body blank having special notching so as to provide a durable double seam at the junction of the double seam and a container end.

Initially, the body blank is formed to the desired configuration and a thermosetting adhesive is applied to one of the adjacent ends of the blank in the area in which the side seam is to be formed. After the seam is complete, the adhesive or cement is cured at an elevated temperature. In this environment, the adhesive sets up hard, rather brittle and with very little ability to flow. The adhesive along with the following side seam configuration, contributes to the success of the new container body and subsequent containers.

In accordance with the teaching of the present invention, the side seam is tilted or canted inwardly which has the effect of reducing the couple tending to pull the outer hook end upwardly when the container is under pressure. With the inward tilt, the seam tends to approach the initial position of a normally fabricated seam after springback and during the heating process instead of assuming an outwardly tilted position in which the seam is more easily pulled apart. Thus, the inward tilting of the seam greatly increases the strength of the seam and decreases the possibility of its being fractured in the seam area.

To further increase the strength of the seam, it is provided with a special beading. The beads are applied in the container body maker when the seam is bumped closed. The beads are many in number and rather high so as to considerably increase the length of the seam that is cemented in order to give a stronger bond. The beads are relatively flat on top and have steeply inclined side walls. The steeply inclined side walls act to place more of the adhesive or cement into a shear type bond rather than in a tensile bond. This further acts to increase the strength of the seam. The close beading also holds the seam locked tightly together and prevents excessive distortion and opening of the seam during the baking operation. Although the adhesive may be applied to opposite ends of the body blank, it is usually applied only to the outside hook of the blank and in a generous quantity so as to achieve a strong bond.

The body blank from which the container body is formed, is notched on the inside hook and on the outside hook. This procedure removes some of the metal from the double seam at the junction making the double seam more nearly of standard width. The body blank of the present invention eliminates the excess metal in the area of the junction of the seam with a container end member so that there is better conformity with less possibility of the container to be improperly formed, thus, greatly eliminating the possibility of leakage. When the seaming roller rides over the junction of a thick seam and a container end of the prior art, the roll has difficulty in returning rapidly to again form the seam since it may have "jumped" and thus caused an improper seal of the same. The invention, by providing a thinner double seam at the junction has greatly eliminated this problem.

In addition to the foregoing, the container body of the present invention has been specially pre-flanged at the top and bottom edges of the container body and in line with the side seam. The special pre-flange is provided with a new "dip" or internally facing transverse bead which provides for easier completion of the bending of the container flange in the double seaming operation. This applies less strain on the adhesive bond with a minimum chance for fracture and leakage.

The invention both as to its organization and method of operation together with further objects and advantages thereof will best be understood by reference to the following specification taken in conjunction with the accompanying drawings, in which:

FIGURE 1 is a plan view of a notched container body blank from which a container body is formed;

FIGURE 2 is a perspective view of a container body and illustrating the novel side seam of the container body;

FIGURE 3 is a sectional view taken along the line 3—3 of the FIGURE 2 and illustrating the inward tilt of the double seam;

FIGURE 4 is a sectional view taken along the line 4—4 of the FIGURE 2 and illustrating the special "dip" in the container wall at the pre-flange of the container body in the area of the side seam; and FIGURE 5 is a sectional view taken along the line 5—5 of the FIGURE 2 and illustrating the special beading of the side seam.

With reference to the FIGURE 1, a container blank 10 is shown in plan view. When the container blank 10 is formed about a tubular forming member, such as a conventional horn, the blank 10 becomes a tubular member suitable for use as a container body to which container ends may be attached. The ends of the contianer blank 10 are joined so as to form the side seam and in the FIGURE 1, the left end of the container blank 10 is identified as an inside hook 12 while the opposite end is identified as the outside hook 14, it being understood that the hooks are not yet bent in this view. In order to achieve a better double seam at the junction of the side seam and a container end (not shown), the container blank 10 has been notched to a distance $x$ on the outside hook 14 and to a distance $x+y$ on the inside hook 12. This notching removes some of the metal from the junction of the double seam and a container end, thus making it more nearly of standard width.

The notch, having the distance $x$ and which was 0.185 inch in an embodiment successfully constructed and tested in accordance with the principles of the present invention, is composed of an outside sliver notch 16, an outside lap 18, and an outside hook notch 20. Similarly, the notch having the distance $x+y$, which distance was 0.209 inch in an embodiment of the invention which was constructed and successfully tested employing the principles of the present invention, comprises an inside sliver notch 22, an inside lap 24, and an inside hook notch 26. The lower notches are comprised of similar elements.

By using the container blank 10 of the FIGURE 1 for forming tubular members, there results better conformity with greater possibility for proper formation and with a resulting lesser possibility for leakage of a finished filled container. The double seam so formed at the junction of the side seam with a container end (not shown) reduces the problem of loose seaming immediately in the area after the "bump" triggered by the side seam. When the seaming roller rides over a thick prior art seam at the junction, the roller has difficulty due to its momentum in rapidly returning to again form the normal double seam and, thus, the double seam immediately past the side seam is not always tightly secured.

As noted, the specially designed notches of the container blank 10 of the FIGURE 1 are designed so that the number of plate layers at the juncture area between the side seam of the container body and the container end is reduced. This feature produces an improved double seam and minimizes leakage. The notching of the container blank 10 was designed and constructed in such a manner that the inside and outside notches are extended just up to the bottom of the double seam. Therefore, the end lock projection is kept just at the bottom of the double seam. The end lock projection referred to, is designed to form the inside lap over the extended outside hook 14, and to form the outside lap over the inside hook 12. This new principle eliminated the springback caused by the outside hook extended portion. The outside hook extended portion contributed to causing the lap to open and to produce a leaky container if this void area was not bonded. Due to the characteristics of the adhesive or bonding materials employed, some shrinking is encountered during the curing or heating process. Any void or pinhole created by the springback of the hooks would cause leaky containers.

In the FIGURE 2, the container blank 10 of the FIGURE 1 has been formed into a container body 10', which incorporates the features of the novel side seam identified as 28. The features of the side seam 28 are best illustrated with reference to the FIGURES 3, 4 and 5.

The FIGURE 3 is a sectional view taken along the line 3—3 of the FIGURE 2 and illustrates the side seam tilt and hook construction. The side seam 28 is comprised of the inside hook 12 which is joined to an inside hook support wall 30 by an inside hook radius 32. Similarly, the side seam 28 includes the outside hook 14 joined to an outside hook support wall 34 by an outside hook radius 36.

The inward tilt of the side seam 28 is accomplished by bending certain areas of the seam 28 and container blank 10 during the forming process. For example, a radius 38 is effected by the upward travel of a section of the blank 10 identified as 40 which extends from the inside hook support wall 30. Thereafter, a second radius 42 is formed at the leftmost end of the section 40 and from this radius 42, the general circular configuration of the container body 10' is continued. Similarly, a radius 44 is effected between the outside hook support 34 and a section identified as 46. A small radius 48 is formed at the rightmost end of the section 46, and from there on, the container body 10' continues its circular travel to eventually meet with the section of blank from the radius 42. Within the interstices of the insde hook 12, the outside hook 14, the inside hook support wall 30, the outside hook support wall 34, the outside hook radius 36 and the section of blank 40, and the inside hook radius 32 and the section of blank 46, there is deposited a sufficient quantity of a thermosetting adhesive 50 so as to form an effective bond between all of the elements. Initially, the adhesive 50 is applied to the outside hook 14 and then spreads within the side seam 28 as best shown in the FIGURE 3. Thereafter, the adhesive 50 is cured at an elevated temperature which causes the adhesive 50 to set up and thus resist any force tending to cause the side seam 28 into a condition of cleavage.

The tilting or canting of the side seam as best shown in the FIGURE 3, has the effect of reducing the couple tending to force the outside hook 14 and the outside hook support wall 34 outwardly (or upwardly as shown in the FIGURE 3) when the container is under pressure. With this tilt, the side seam 28 tends to approach the initial position of a normally made seam after springback and, during the curing of the adhesive, whereas a normally made seam will tilt in an opposite direction after springback and, during curing, to assume a position in which the seam is more easily pulled apart. The tilting of the side seam 28 thus greatly increases the strength of the seam and provides insurance against cleavage of the seam.

In models of the invention which have been constructed and successfully tested in accordince with the principles of the present invention, the tilt of the side seam 28 was 7½ degrees, although it will be readily understood that variations from this angle would be easily tolerated. This feature provides a smaller outside side seam opening and a uniform outside periphery of the container which also contributes to a uniform display of the bonding adhesive.

The FIGURE 4 is a sectional view taken along the line 4—4 of the FIGURE 2 and illustrates the feature of the special pre-flange of the container body immediately adjacent and in line with the side seam 28. The "dip" or the transverse internally projecting pre-flange bead is introduced in order to reduce the strain at the lap area and to minimize the possibility of the cracking of the bonded lap or failure during the subsequent flanging operation. The pre-flange bead is formed in the bumping operation of the side seam 28. The pre-flange and pre-flange bead are also tilted 7½ degrees although it will be readily understood that other angles may be successfully employed.

As shown in the FIGURE 4, the container body 10' is joined by the side seam 28 comprised of the outside hook support wall 34, the inside hook 12, the outside hook 14 and the inside hook support wall 30. It will be understood that the adhesive 50 is deposited within the interstices of the foregoing elements. As noted in the FIGURES 1 and 4, the inside hook 12 and the outside hook 14 are shorter than their adjacent support walls 30 and 34 so that in the area 30' and 34', the inside hook support wall 30 and the outside hook support wall 34 surround the ends of the inside hook 12 and the outside hook 14 and come together as shown. During the bumping operation, the support walls 30 and 34 are bumped at the point 52 thus producing the "dip," or internally projecting transverse bead as shown, and forcing the extreme end of the support walls 30 and 34 outwardly as shown. These outwardly projecting pre-flange portions are identified as 30" and 34". The pre-flange portions are also preferably tilted at the same 7½ degree angle of the side seam 28 as is the transverse bead at 52. This new "dip" or internally projecting transverse bead 52 at the juncture of the pre-flange portions 30" and 34" and the support walls 30' and 34' provides for easier completion of the bending of the container flange while affixing a container end to the container body 10'. It will be readily apparent that the side seam 28 at the lower area of the FIGURE 4 in which a container end would be attached due to the shorter hooks 12 and 14, presents only a double thickness of material whereas it is customary for the side seam to be four thicknesses of material at the junction of the side seam and the container end (not shown).

A further feature of the invention for providing a sturdy bonded seam is shown in the FIGURE 5. The FIGURE 5 is a sectional view along the line 5—5 of the FIGURE 2 and illustrates the special beading which is applied to the side seam 28. It will be noted that a plurality of substantially uniform beads 54 are formed in the side seam 28 composed of the inside hook 12, the outside hook 14, the inside hook support wall 30 and the outside hook support wall 34. These four elements are displaced from their former substantially parallel position to form the beads 54, as shown. The beads 54 are applied in the container body maker when the side seam 28 is bumped closed. Being rather high and numerous in quantity, the beads 54 add considerably to the length of the seam that is cemented so as to give a stronger bond. The beads 54 are relatively flat on top and have rather steeply inclined side walls 56 so as to place more of the adhesive in the side seam 28 in a shear type of bond rather than in a tensile bond as provided by the flatter areas. The result is increased seam strength. The close continuous beading also holds the seam locked tightly together and prevents excessive distortion and opening of the seam during the adhesive curing operation which tends to distort the seam.

In an embodiment of the invention which was successfully constructed and tested, the beads 54 were placed at ¼ inch intervals so as to insure absolute minimum movement of the side seam 28 after fabrication and during the adhesive curing cycle. The corrugation effect produced by the beads 54 contributes to the mechanical strength of the side seam 28, which contribution was essential to successful container performance. Also, the corrugation effect produced by the beads 54 allows the outside fillet to form a mechanical bond in addition to an adhesive bond for added strength of the side seam 28. Further, the beads 54 will lock the side seam and restrict the seam movement to a minimum. This will eliminate adhesive disturbance during the adhesive curing cycle.

Thus, there has been illustrated and described an article and a method for producing the article, which is in the form of a bonded side seam which joins a container blank to form a container body. Heretofore, conventional body making apparatus could not be employed to produce container bodies capable of withstanding high pressures and temperatures, of difficult to solder metals, such as aluminum, the reason being that the aluminum could not be successfully soldered in the area of the side seam and prior cemented seams were unsuccessful. Therefore, the invention contemplates that conventional body making apparatus can be employed with a minimum degree of modification to the apparatus for fabricating vessels capable of storing products under pressure from the difficult to solder materials.

In the present invention, a tubular member suitable as a container body has been fabricated having a side seam which is bonded with an adhesive. Further steps are performed to the container body so as to eliminate cleavage of the container body or leakage of the contents once the body is completed and filled. One of the features which contributes to the sturdiness of the container is the disposition of the side seam. For example, the side seam is tilted inwardly so as to reduce the couple tending to open the seam while a force is being applied to the seam. A further feature of strengthening the seam is the application of continuous beading along the seam so as to lock the inside and outside hooks in place and also to place some of the bonding material in a shear type of bond as well as a tensile type of bond.

A further contribution to the effectiveness of the container is the manner in which the blank is formed. For example, notches are formed in the corners of the blank of dimensions so as to present only a double thickness of side seam in the area adjacent the position in which the container ends are attached. This further makes for easier seaming and rolling when the container ends are attached.

Another feature of the invention relates to the provision of a transverse internally projecting pre-flange bead in the container side seam which is introduced in order to reduce the strain at the overlapping area and thus minimize the possibility of cracking of the adhesive bond or failure during the subsequent flanging operation. This pre-flange bead is formed in the bumping operation of the side seam.

Although various measurements, materials, and angles have been set forth, it will be readily understood to those skilled in the art that various departures from the foregoing figures will still permit a successful practice of the invention. The adhesive or cement used in the side seam is of the thermosetting type which has excellent strength and becomes relatively hard and non-flowable once it is cured. In addition, although the invention has been set forth as showing the invention being practiced by forming a double seam or double hook seam to join the body blank, it will be understood that other types of seams may be successfully employed and come within the purview of the invention.

It is also to be understood that when desired the cemented side seam of the invention may be employed as a replacement for the usual soldered side seam employed when steel or tin plated steel container bodies are being manufactured. Further, the side seam features of the invention may be employed in containers that have the side seam soldered in the usual way with the solder replacing the thermosetting cement.

Thus, the present invention may be embodied in other specific forms without departing from the spirit and the essential characteristics of the invention. The present embodiment is, therefore, to be considered in all respects as illustrative and the scope of the invention being indicated by the appended claims, rather than the foregoing description, and all changes which come within the meaning and range of the equivalency of the claims are, therefore, intended to be embraced therein.

What is claimed is:

1. A tubular member formed of sheet material and comprising a body having edges thereof joined together in a side seam including overlapping layers of said sheet material, said body being of a circular cross-sectional outline and said side seam being tilted relative to said circular outline beginning at the intersection of an outermost layer of said overlapping layers with said body and inclining radially inwardly therefrom so as to resist cleavage between said overlapping layers, beads having inclined side walls extending transversely across said seam, and said tubular member having flanged ends.

2. A tubular member according to claim 1 wherein said side seam is parallel to the longitudinal axis of said tubular member.

3. A tubular member according to claim 1 wherein said side seam is of a double hook construction.

4. A container body formed of sheet material and comprising a body portion having edges thereof joined together in a side seam including overlapped layers of said sheet material portion, said container body being of cross-sectional outline and said side seam being tilted relative to said circular outline beginning at the intersection on an outermost layer of said overlapping layers with said body portion and inclining radially inwardly therefrom so as to resist cleavage between said overlapping layers, beads having inclined side walls continuously extending transversely across said seam, and said container body having flanged ends.

5. The container body of claim 4 wherein said side seam is of a double hook construction.

6. The container body of claim 4 wherein said side seam is of a double hook construction, and an adhesive is dispersed among the interstices of said side seam.

7. A container body formed of sheet material and comprising a body portion having edges thereof joined together in a double hook side seam including overlapping layers of said sheet material, said body portion having a circular cross-sectional outline, and said side seam being tilted relative to said circular outline beginning at the intersection of an outermost layer of said overlapping layers with said body portion and inclining radially inwardly therefrom to resist cleavage between said overlapping layers.

8. A container body in accordance with claim 7 wherein bonding material is dispersed among the interstices of said double hook side seam.

9. A tubular container body formed of sheet material having ends joined by a side seam, said side seam having a pre-end seam flange portion at at least one of its ends, and a bead extending transversely across said side seam at the intersection of said pre-end seam flange portion with the remainder of said container body to prevent cracking of said side seam at said one end during a subsequent flanging of said container body.

10. The container body of claim 9 wherein said bead is inwardly directed.

References Cited

UNITED STATES PATENTS

| | | | |
|---|---|---|---|
| 663,385 | 12/1900 | Hobbs | 220—77 |
| 1,625,229 | 4/1927 | Hollberg | 220—81 |
| 2,199,527 | 5/1940 | Sebell | 220—67 |
| 2,233,549 | 3/1941 | O'Neill | 220—77 |
| 2,318,603 | 5/1943 | Erb | 220—67 |
| 2,342,109 | 2/1944 | Atkinson | 220—75 |
| 2,679,305 | 5/1954 | Gunthorp | 220—81 |
| 2,801,648 | 8/1957 | Anderson, et al. | 220—81 |
| 2,919,255 | 12/1959 | Hart | 220—81 |
| 2,967,161 | 1/1961 | Hart | 220—81 |
| 3,048,300 | 8/1962 | Gardner | 220—77 |
| 697,955 | 4/1902 | Thompson | 220—77 |
| 2,390,553 | 12/1945 | Pittner. | |
| 2,494,507 | 1/1950 | Curtis | 220—91 |

THERON E. CONDON, *Primary Examiner.*

J. R. GARRETT, *Assistant Examiner.*

U.S. Cl. X.R.

113—120; 138—164; 220—81